United States Patent
Liu

(10) Patent No.: US 9,260,128 B2
(45) Date of Patent: Feb. 16, 2016

(54) COLLAPSIBLE STROLLER HAVING REVERSIBLE SEAT

(71) Applicant: UNITRON ENTERPRISES ZHUHAI CO., LTD., Zhuhai (CN)

(72) Inventor: Xiuping Liu, Zhuhai (CN)

(73) Assignee: UNITRON ENTERPRISES ZHUHAI CO., LTD., Zhuhai (CN)

( * ) Notice: Subject to any disclaimer, the term of this patent is extended or adjusted under 35 U.S.C. 154(b) by 0 days.

(21) Appl. No.: 14/395,609

(22) PCT Filed: Mar. 28, 2013

(86) PCT No.: PCT/CN2013/073310
§ 371 (c)(1),
(2) Date: Oct. 20, 2014

(87) PCT Pub. No.: WO2013/155928
PCT Pub. Date: Oct. 24, 2013

(65) Prior Publication Data
US 2015/0076795 A1    Mar. 19, 2015

(30) Foreign Application Priority Data

Apr. 20, 2012    (CN) .......................... 2012 1 0119426

(51) Int. Cl.
*B62B 1/00*    (2006.01)
*B62B 7/14*    (2006.01)
*B62B 7/08*    (2006.01)
(Continued)

(52) U.S. Cl.
CPC ................ *B62B 7/145* (2013.01); *B60N 2/005* (2013.01); *B60N 2/26* (2013.01); *B62B 7/062* (2013.01); *B62B 7/08* (2013.01); *B62B 7/142* (2013.01); *B62B 7/147* (2013.01); *B62B 7/064* (2013.01)

(58) Field of Classification Search
CPC .............. B62B 1/00; B62B 7/00; B62B 7/06; B62B 9/104; B62B 7/145
USPC ................. 280/642, 643, 647, 648, 650, 658, 280/47.34, 657
See application file for complete search history.

(56) References Cited

U.S. PATENT DOCUMENTS 6,513,827 B1 *  2/2003  Barenbrug .................... 280/648
7,267,359 B1 *  9/2007  Yang et al. .................... 280/642
(Continued)

FOREIGN PATENT DOCUMENTS

CN    201287756 Y    8/2009
CN    101638103 A    2/2010
(Continued)

OTHER PUBLICATIONS

International Search Report of PCT/CN2013/073310 mailed Jul. 11, 2013.

*Primary Examiner* — Hau Phan
(74) *Attorney, Agent, or Firm* — Nelson Mullins Riley & Scarborough LLP

(57) ABSTRACT

A collapsible stroller comprising a frame and a reversible seat (5) comprising an armrest portion (5.5) is provided. The reversible seat (5) is mountable via an attachment point on the stroller frame in either a forward or rearward orientation with respect to the stroller frame, and in such a way that the attachment point can be moved relative to the stroller frame for collapse of the reversible seat (5) along with the stroller frame, irrespective of the reversible seat's orientation. An associated reversible seat structure is also disclosed.

9 Claims, 9 Drawing Sheets

(51) Int. Cl.
  *B62B 7/06* (2006.01)
  *B60N 2/005* (2006.01)
  *B60N 2/26* (2006.01)

(56) References Cited

U.S. PATENT DOCUMENTS

| | | | |
|---|---|---|---|
| 7,377,537 B2 * | 5/2008 | Li | 280/650 |
| 7,798,500 B2 * | 9/2010 | Den Boer | 280/47.34 |
| 7,938,435 B2 * | 5/2011 | Sousa et al. | 280/658 |
| 8,061,732 B2 * | 11/2011 | Song et al. | 280/650 |
| 8,733,784 B2 * | 5/2014 | Kobayashi | 280/647 |
| 8,764,048 B1 * | 7/2014 | Ahnert et al. | 280/658 |
| 8,777,253 B2 * | 7/2014 | Minato et al. | 280/647 |
| 8,955,869 B2 * | 2/2015 | Zehfuss | 280/648 |
| 2008/0231022 A1 * | 9/2008 | Hu et al. | 280/643 |
| 2009/0243261 A1 | 10/2009 | Sousa et al. | |
| 2013/0113188 A1 * | 5/2013 | Liao | 280/650 |

FOREIGN PATENT DOCUMENTS

| | | |
|---|---|---|
| CN | 201646813 U | 11/2010 |
| CN | 101898575 A | 12/2010 |
| CN | 202541613 U | 11/2012 |
| CN | 202574327 U | 12/2012 |
| EP | 2371672 A2 | 10/2011 |
| GB | 2342897 A | 4/2000 |

\* cited by examiner

COLLAPSIBLE STROLLER HAVING REVERSIBLE SEAT

TECHNICAL FIELD

The invention relates to a collapsible stroller, in particular a stroller with a reversible seat.

PRIORITY

This patent application claims priority from:
Chinese Application No 201210119426.X, titled 'Reversible Seat and Collapsible Stroller Having Reversible Seat', and filed on 20 Apr. 2012;
The entire content of this application is hereby incorporated by reference.

BACKGROUND

A problem with some strollers having reversible seats, is that the stroller frame can only be collapsed after the reversible seat is removed. For other strollers the stroller frame can only be collapsed when the reversible seat is mounted in a given orientation and/or via one of a plurality of available attachment points. If the stroller frame is collapsed when the reversible seat is mounted in any other way, the reversible seat will either significantly protrude outside the collapsed stroller frame and thus will not be snugly collapsed along with the stroller frame, or fail to collapse at all.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY OF THE INVENTION

In one aspect of this invention, there is proposed a collapsible stroller comprising a frame and a reversible seat comprising an armrest portion, where the reversible seat is mountable in either of a forward or rearward orientation with respect to the stroller frame, and in such a way that the reversible seat can be moved relative to the stroller frame for collapse along with the stroller frame irrespective of its orientation. Thus, the parents using such a stroller with the reversible seat can collapse the reversible seat along with the stroller frame, irrespective of the mounting orientation of the reversible seat, and without need to change the attachment point.

In a further aspect of this invention, there is proposed a collapsible stroller comprising a frame, the frame comprising a handle tube, a front leg tube comprising a front wheel assembly, a rear leg tube comprising a rear wheel assembly, and a stroller frame joint assembly connecting the handle tube, the front leg tube and the rear leg tube with each other, the stroller frame joint assembly comprising a mount for a reversible seat, where the reversible seat is mountable in either of a forward or rearward orientation with respect to the stroller frame, the reversible seat comprising at least a backrest portion, a seating portion, an armrest portion and a seat joint assembly connecting the backrest portion, the seating portion and the armrest portion, and the mount for the reversible seat comprises a single attachment point for the seat joint assembly, wherein in use, the mount is rotatable with respect to the stroller frame joint assembly during collapse of the stroller, so that each of the handle tube, front leg tube and rear leg tube of the stroller frame, and the backrest portion, seating portion and armrest portion of the reversible seat are all substantially parallel when collapsed, irrespective of whether the reversible seat was in the forward or rearward orientation with respect to the stroller frame.

In one form, the seat joint assembly comprises an engaging projection, and the mount for the reversible seat comprises a single engaging recess for receiving the engaging projection of the reversible seat.

In one form, the stroller frame joint assembly comprises position-regulating portions, and wherein in use, when the stroller frame is deployed, the position-regulating portions move the attachment point of the mount into a position suitable for the mounting of the reversible seat, and when the stroller frame is collapsed, the position-regulating portions open with the rotation of the stroller frame so that the attachment point comes into a rotatable state.

In one form, when the reversible seat is mounted in a forward orientation, the mount rotates in a forward direction during collapse, and the reversible seat collapses against the front leg tube.

In one form, when the reversible seat is mounted in a rearward orientation, the mount rotates in a rearward direction during collapse, and the reversible seat collapses against the rear leg tube.

In one form, the stroller frame joint assembly comprises an upper joint fixedly attached to the handle tube, a lower joint fixedly attached to the front leg tube, a joint cover fixedly attached to the rear leg tube, and a stroller safety lock for controlling the pivoting of the upper joint and the lower joint; the upper joint and the lower joint can pivot about a common axis or two respective axes on the joint cover, and are meshed with each other by gears.

In one form, the stroller frame joint assembly is provided with two position-regulating portions, in which a first position-regulating portion is provided on the lower joint and a second position-regulating portion is provided on the upper joint.

In one form, the reversible seat further comprises an armrest portion, and the seat joint assembly connects the backrest portion, the seating portion and the armrest portion with each other, and comprises a seat safety lock for controlling the opening and closing of the seat joint assembly, wherein the seat joint assembly is being movable between a locked state in which the reversible seat is locked into a fully opened state, and a released state in which the reversible seat is collapsible, the seat joint assembly further comprising an armrest stopper, wherein when the seat joint assembly is in the locked state, the armrest portion is positioned at a height for normal use by the armrest stopper; and when the seat joint assembly is in the released state the armrest portion follows the backrest portion of the seat when this is rotated between either of its fully opened or collapsed positions, so as to thereby lay substantially parallel to the backrest portion when collapsed.

In one form, the seat joint assembly further comprises an armrest stopper, the armrest stopper wherein when the seat joint assembly is in the locked state, the armrest portion is positioned at a height for normal use by the armrest stopper, and when the seat joint assembly is in the released state the armrest stopped can be rotated along with the seat joint assembly away from the armrest portion so that the armrest portion is in a free state, or rotated along with the seat joint assembly toward the armrest portion so as to come into contact with the armrest portion, thus causing the armrest portion to be opened. In one form, the seat joint assembly comprises a first engaging member, a second engaging member, a movable slider, an elastic member, a pushing member and an armrest guide block, and wherein the seating portion is fixedly attached to the first engaging member, and the backrest portion is fixedly attached to the second engaging member, the movable slider, the elastic member and the pushing member are arranged between the first engaging member and the second engaging member; and wherein the armrest guide block is fixed at one end of the armrest portion and is movably fitted in guiding grooves of the first engaging member and the second engaging member; and wherein the first engaging member, the movable slider, the pushing member and the second engaging member are connected with each other by means of a pivot pin, the movable slider can be moved in an axial direction of the pivot pin by the pushing member, and the first and second engaging members are engaged or released under the effect of the movable slider.

In one form, the armrest stopper is provided on the second engaging member so as to cooperate with the armrest guide block.

In one form, the seat safety lock comprises a releasing lever provided on the backrest portion and connected to the pushing member through a pulling member.

In a further aspect of this invention, there is proposed a collapsible stroller comprising a frame and a reversible seat, where the reversible seat is mountable via an attachment point on the stroller frame in either of a forward or rearward orientation with respect to the stroller frame, and in such a way that the attachment point can be moved relative to the stroller frame for collapse of the reversible seat along with the stroller frame, irrespective of the reversible seat's orientation.

In yet a further aspect of this invention, there is proposed a reversible seat mountable on a stroller frame in either of a forward or rearward orientation, the reversible seat comprising a backrest portion, a seating portion, an armrest portion, and a seat joint assembly connecting the backrest portion, the seating portion and the armrest portion with each other, and a seat safety lock for controlling the opening and closing of the seat joint assembly, the seat joint assembly being movable between a locked state in which the reversible seat is locked into a fully opened state, and a released state in which the reversible seat is collapsible, and wherein when the seat joint assembly is in the locked state, the armrest portion is positioned at a height for normal use, and when the seat joint assembly is in the released state the armrest portion follows the backrest portion of the seat when this is rotated between either of its fully opened or collapsed positions, so as to thereby lay substantially parallel to the backrest portion when collapsed.

In one form, the seat joint assembly further comprises an armrest stopper, such that when the seat joint assembly is in the locked state, the armrest portion is positioned at a height for normal use by the armrest stopper, and when the seat joint assembly is in the released state the armrest stopped can be rotated along with the seat joint assembly away from the armrest portion so that the armrest portion is in a free state, or rotated along with the seat joint assembly toward the armrest portion so as to come into contact with the armrest portion, thus causing the armrest portion to be opened. In a further aspect of this invention, there is proposed a collapsible stroller, a frame of the stroller comprising a handle tube, a front leg tube with a front wheel assembly, a rear leg tube with a rear wheel assembly, and a stroller frame joint assembly connecting the handle tube, the front leg tube and the rear leg tube with each other, wherein the stroller comprises the above-mentioned reversible seat which is mounted on the stroller frame joint assembly.

In one form, a single rotatable engaging recess is pivotably provided on the stroller frame joint assembly, and the reversible seat is provided with an engaging projection which can be inserted into the engaging recess, and wherein the stroller frame joint assembly is provided with position-regulating portions; when the stroller frame is deployed, the position-regulating portions move the engaging recess into a position suitable for the mounting of the reversible seat, and when the stroller frame is collapsed, the position-regulating portions open along with the rotation of the stroller frame so that the engaging recess comes into a rotatable state.

The reversible seat and the collapsible stroller of the invention are simple, reliable, and easy to use, and low in cost.

BRIEF DESCRIPTION OF DRAWINGS

An illustrative embodiment of the present invention will be discussed with reference to the accompanying drawings wherein.

In the following description, like reference characters designate like or corresponding parts throughout the several views of the drawings.

DETAILED DESCRIPTION

Figure 1:
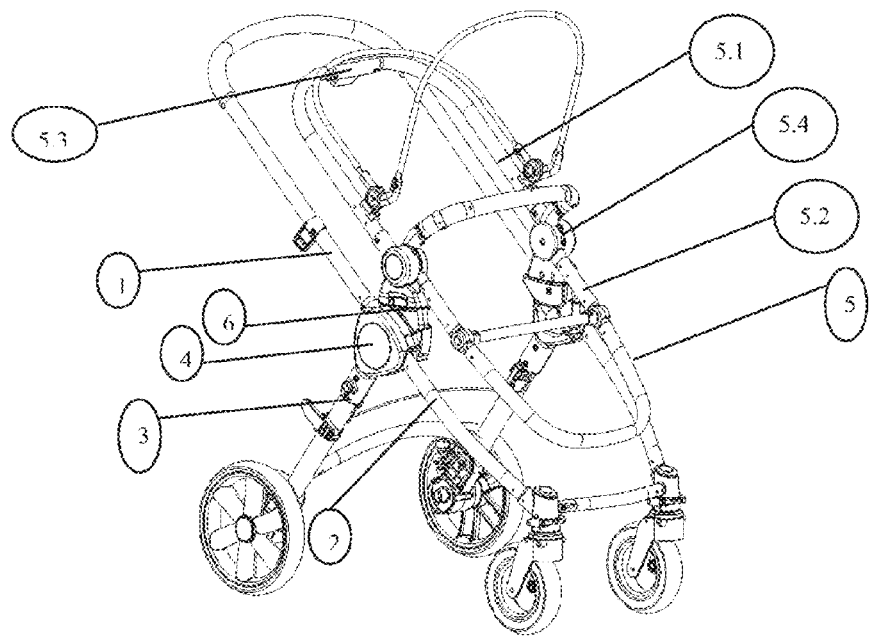
FIG. 1 is a perspective view of a stroller frame.

Referring now to FIG. 1, a collapsible stroller comprises a handle tube 1, a front leg tube 2 with a front wheel assembly, a rear leg tube 3 with a rear wheel assembly, a stroller frame joint assembly 4 connecting the handle tube 1, the front leg tube 2 and the rear leg tube 3 with each other, and a reversible seat 5.

Figure 5:
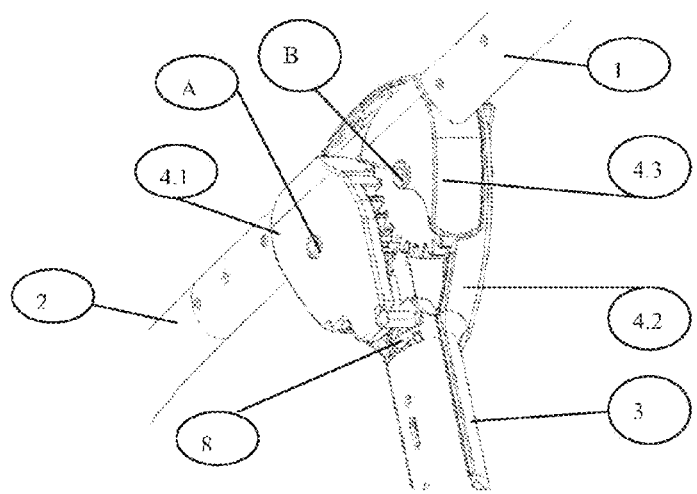
FIG. 5 is a schematic view showing the stroller frame joint assembly.

As shown in FIG. 5, the stroller frame joint assembly 4 comprises an upper joint 4.3 fixedly attached to the handle tube 1, a lower joint 4.1 fixedly attached to the front leg tube 2; a joint cover 4.2 fixedly attached to the rear leg tube 3, and a stroller safety lock 8 for collapsing the stroller. The upper joint 4.3 and the lower joint 4.1 can pivot about an axis A and B on the joint cover respectively, and meshed with each other by gears. The stroller safety lock 8 is used for controlling the pivoting of the upper joint 4.3 and the lower joint 4.1 about the axis A and B on the joint cover. As an alternative, both the upper joint and the lower joint pivot about a common axis on the joint cover.

As shown in FIGS. 1-4, a mount (for the reversible seat 5) comprising an attachment point in the form of an engaging recess 6 is provided on the stroller frame joint assembly 4, and is pivotable about an axis 11. Further, the stroller frame joint assembly 4 is provided with two position-regulating portions, wherein a first position-regulating portion 9 is provided on the lower joint 4.1 attached to the front leg tube 2, and a second position-regulating portion 10 is provided on the upper joint 4.3 attached to the handle tube 1. When the stroller frame is deployed, the two position-regulating portions move the engaging recess 6 into a position suitable for the mounting of the reversible seat 5, and when the stroller frame is collapsed, the two position-regulating portions open along with the rotation of the stroller frame so that the engaging recess 6 comes into a pivotable state.

Figure 6:
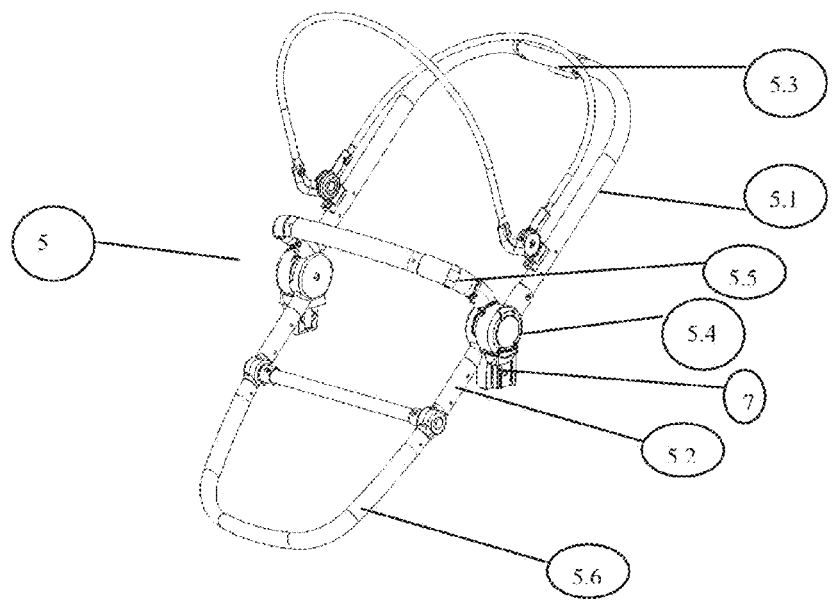
FIG. 6 is a schematic perspective view showing the reversible seat.

As shown in FIG. 6, the reversible seat 5 comprises a backrest portion 5.1, a seating portion 5.2, an armrest portion 5.5, a footrest portion 5.6, a seat joint assembly 5.4 connecting the backrest portion 5.1, the seating portion 5.2 and the armrest portion 5.5 with each other, and a seat safety lock 5.3 for controlling the opening and closing of the seat joint assembly 5.4.

Figure 2:
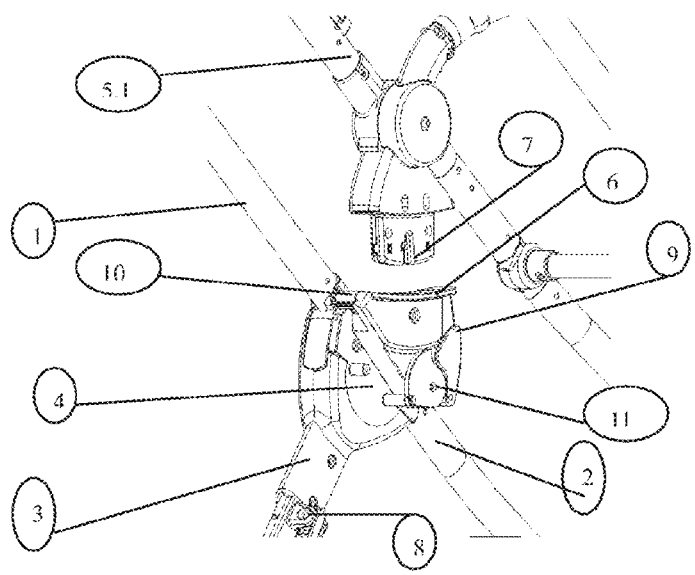
FIG. 2 is a schematic view showing the engaging recess (i.e. attachment point) of the mount for the reversible seat, and the stroller frame joint assembly.
Figure 7:
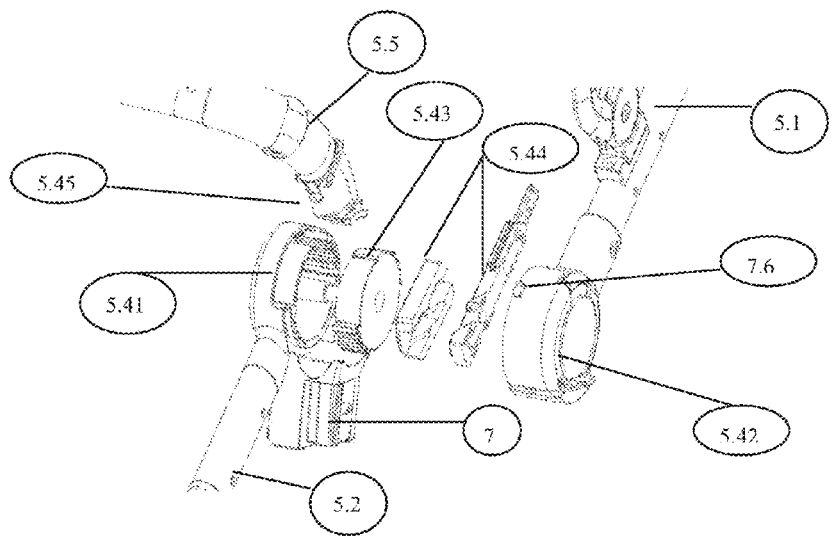
FIG. 7 is a schematic view showing the seat joint assembly of the reversible seat.

As shown in FIG. 7, the seat joint assembly 5.4 comprises: a first engaging member 5.41, a second engaging member 5.42, a movable slider 5.43, an elastic member (not shown), a pushing member 5.44 and an armrest guide block 5.45. The seating portion 5.2 is fixedly attached to the first engaging member 5.41, and the backrest portion 5.1 is fixedly attached to the second engaging member 5.42. The movable slider 5.43 and the pushing member 5.44 nest between the first engaging member 5.41 and the second engaging member 5.42. The armrest guide block 5.45 is fixed at one end of the armrest portion and is movably fitted in the guiding grooves of the first engaging member and the second engaging member. The first engaging member 5.41, the movable slider 5.43, the pushing member 5.44 and the second engaging member 5.42 are connected with each other by means of a pivot pin. The movable slider 5.43 can be moved in the axial direction of the pivot pin by the pushing member 5.44. The first engaging member 5.41 is provided with an integrally molded engaging projection 7, which can be inserted into the engaging recess 6 of the stroller frame joint assembly so that the reversible seat 5 can be reversibly mounted on the stroller frame joint assembly 4, as shown in FIGS. 1-2. The seat safety lock 5.3 comprises a releasing lever provided on the backrest portion and connected to the pushing member 5.44 through a pulling member such as a steel cord. The seat joint assembly 5.4 is released by operating the releasing lever, so as to achieve the opening and closing between the backrest portion 5.1 and the seating portion 5.2.

Figure 14:
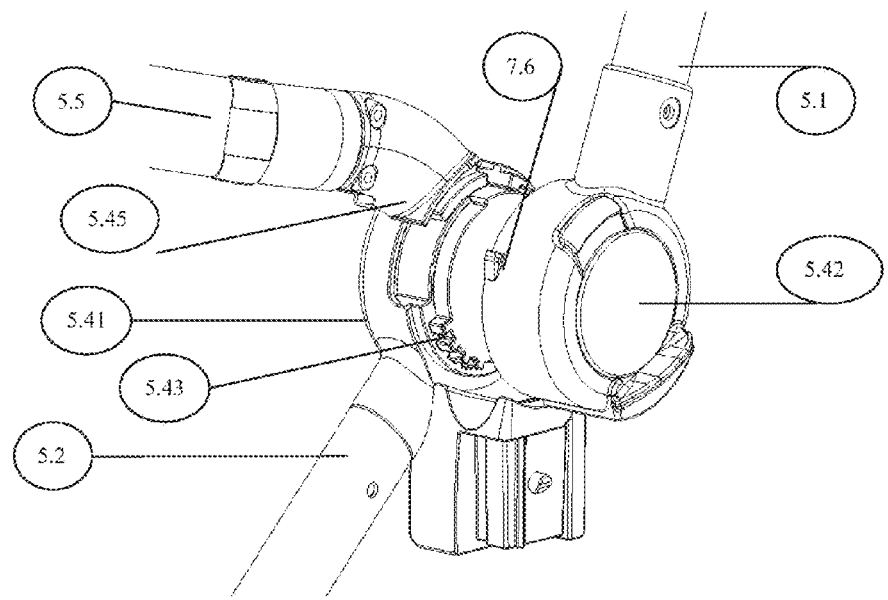
FIG. 14 is a schematic view showing the seat joint assembly of the reversible seat, similar to FIG. 7.
Figure 15:
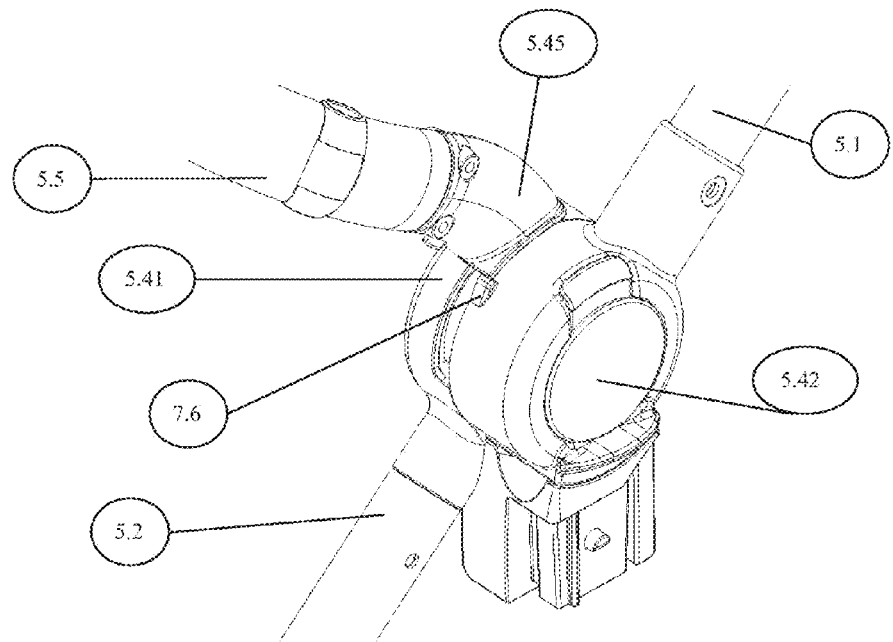
FIG. 15 is a schematic view showing the engaged and locked state of the seat joint assembly of the reversible seat, with the armrest portion positioned at a height for normal use by the armrest stopper.
Figure 16:
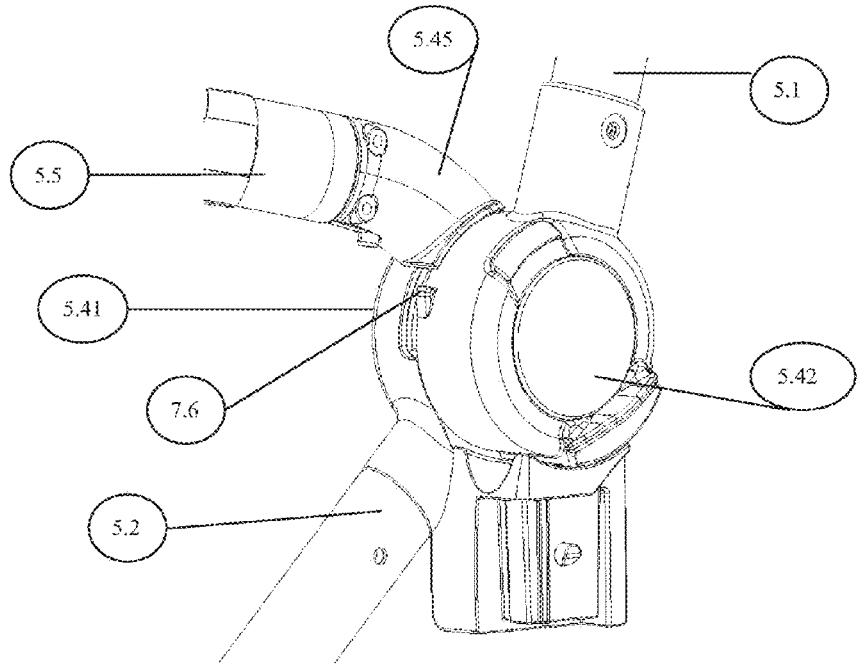
FIG. 16 is a schematic view showing that the armrest stopper rotates along with the seat joint assembly when the backrest portion of the reversible seat is collapsed by operating the seat safety lock.
Figure 17:
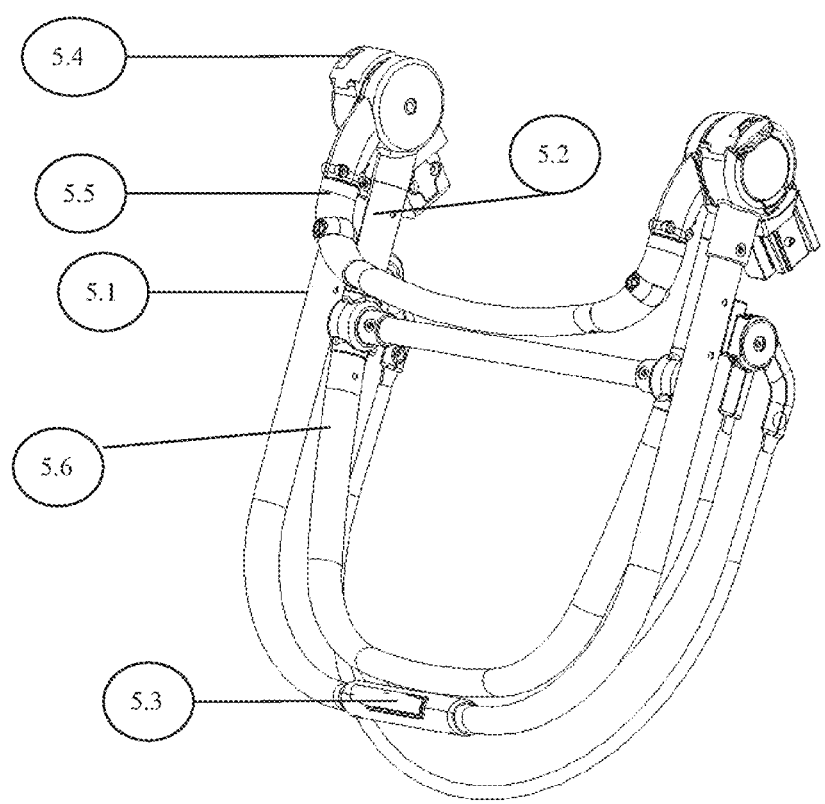
FIG. 17 is a schematic view showing that the backrest portion and the armrest portion of the reversible seat are fully collapsed by operating the seat safety lock.

As shown in FIGS. 7 and 14, according to the invention, the second engaging member 5.42 is provided with an armrest stopper 7.6 cooperating with the armrest guide block 5.45. The operation of the seat joint assembly and the function of the armrest stopper will be described as follows with reference to FIGS. 15-17. When the backrest portion 5.1 and the seating portion 5.2 are fully opened, the first engaging member 5.41 and the second engaging member 5.42 is kept in a locked state by the movable slider 5.43, and the backrest portion 5.1 and the seating portion 5.2 are locked and cannot be collapsed. The armrest portion 5.5 now is positioned at a height for normal use by the armrest stopper 7.6 of the second engaging member 5.42. When the releasing lever of the seat safety lock 5.3 is operated, the pushing member 5.44 is driven and thus pushes the movable slider 5.43 to move in the axial direction, so that the first engaging member 5.41 and the second engaging member 5.42 are released and thus the backrest portion 5.1 and the seating portion 5.2 can be freely opened and closed. Now, when the backrest portion 5.1 is opened, the armrest stopper 7.6 rotates along with the seat joint assembly towards the armrest portion, and comes into contact with the armrest portion after the rotation of a certain stroke. Thus, the armrest portion 5.5 is raised with the opening of the backrest portion 5.1 by the armrest stopper 7.6 of the second engaging member 5.42. When the backrest portion 5.1 is collapsed toward the seating portion 5.2, the armrest stopper 7.6 of the second engaging member is rotated away from the armrest portion. Now, the armrest portion is in a free state so as to be able to fall with the collapsing of the backrest portion 5.1 under the gravity of the armrest portion.

The collapsing of the reversible seat along with the stroller frame according to the invention will be described as follows.

Figure 3:
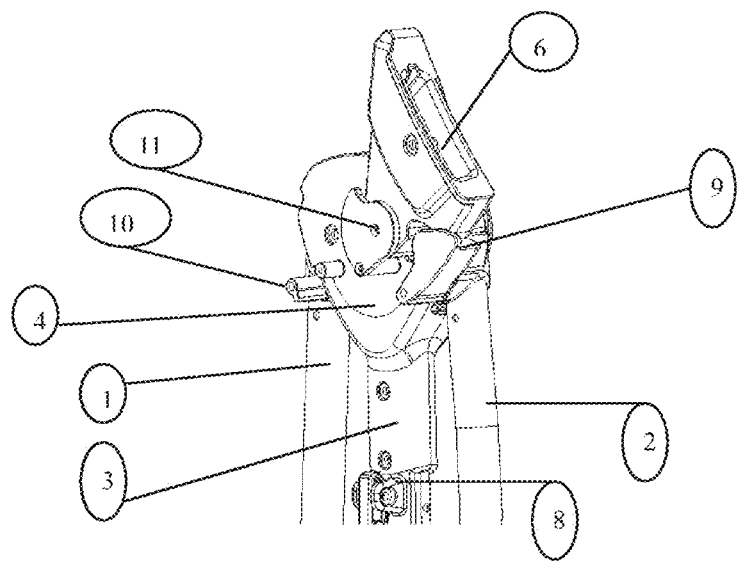
FIG. 3 is a schematic view showing the engaging recess rotated forward when the stroller frame is collapsed and the two position-regulating portions are in the opened state.
Figure 8:
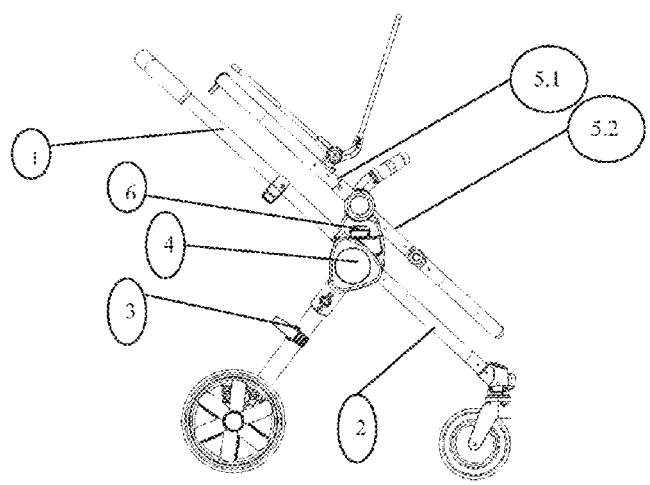
FIG. 8 is a schematic side view showing the reversible seat mounted in a forward orientation, with the engaging projection inserted into the engaging recess.
Figure 9:
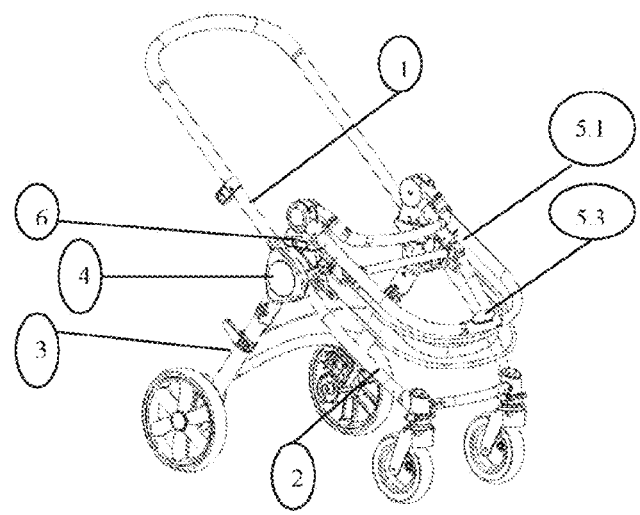
FIG. 9 is a schematic perspective view showing the collapsing of the backrest portion toward the seating portion when the reversible seat is mounted in a forward orientation.
Figure 10:
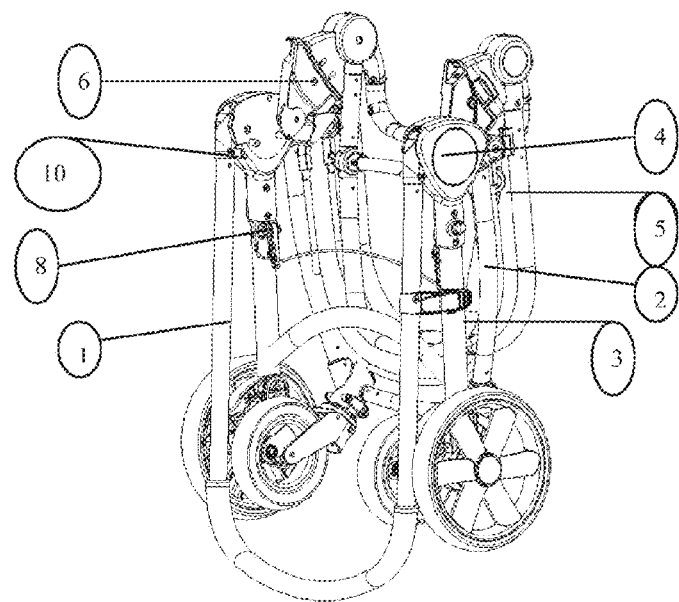
FIG. 10 is a schematic view showing the collapsing of the backrest portion toward the seating portion and the collapsing of the reversible seat along with the stroller frame toward the rear leg tube when the reversible seat is mounted in a forward orientation.

As shown in FIGS. 8-10 and with reference to FIG. 3, the reversible seat 5 of the invention may be mounted in a forward orientation, with the engaging projection 7 inserted into the engaging recess 6. The backrest portion 5.1 is collapsed forward by releasing the seat safety lock 5.3 of the reversible seat 5, and the center of gravity of the reversible seat 5 moves forward with respect to the common axis 11 of the engaging projection and the engaging recess. Then, the stroller frame is collapsed by releasing the stroller safety lock 8. Now, the two position-regulating portions 9 and 10 of the engaging recess 6 are opened. The reversible seat 5, the center of gravity of which has moved forward, is pushed so as to automatically rotate forward together with the engaging recess 6 and approaches the rear leg tube 3 along with the front leg tube 2. Thus, the reversible seat 5 and the stroller frame are collapsed together.

Figure 4:
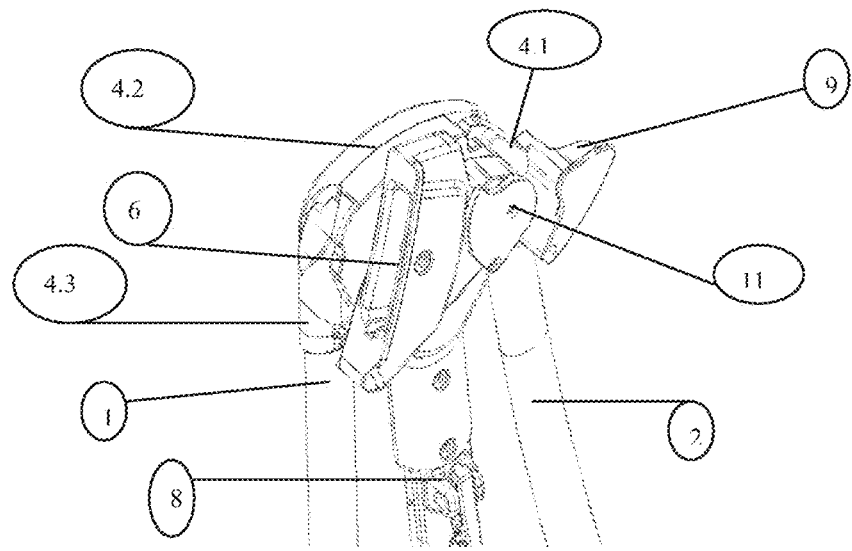
FIG. 4 is a schematic view showing the engaging recess rotated rearward when the stroller frame is collapsed and the two position-regulating portions are in the opened state.
Figure 11:
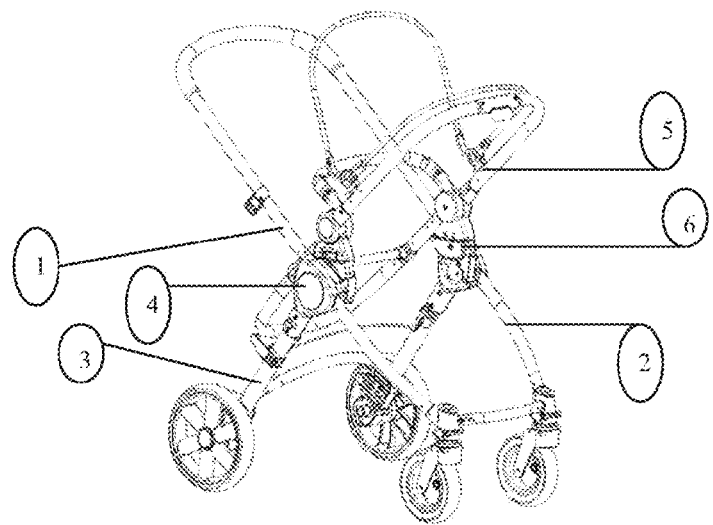
FIG. 11 is a schematic perspective view showing the reversible seat mounted in a rearward orientation, with the engaging projection inserted into the engaging recess.
Figure 12:
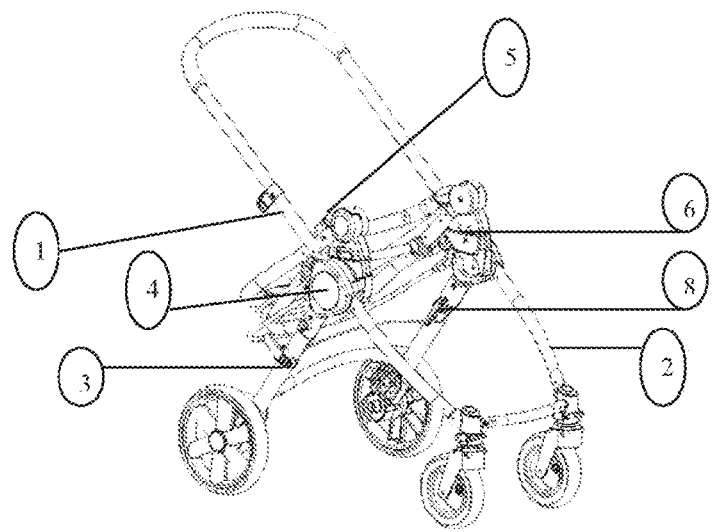
FIG. 12 is a schematic perspective view showing the collapsing of the backrest portion toward the seating portion when the reversible seat is mounted in a rearward orientation.
Figure 13:
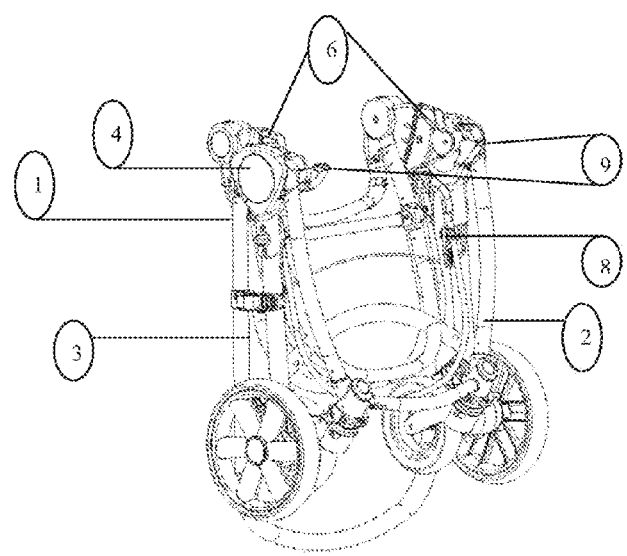
FIG. 13 is a schematic perspective view showing the collapsing of the backrest portion toward the seating portion and the collapsing of the reversible seat along with the rear leg tube and thus the stroller frame when the reversible seat is mounted in a rearward orientation.

As shown in FIGS. 11-13 and with reference to FIG. 4, the reversible seat 5 of the invention may be mounted in a rearward orientation, with the engaging projection 7 inserted into the engaging recess 6. The backrest portion 5.1 is collapsed rearward by releasing the seat safety lock 5.3, and the center of gravity of the reversible seat 5 moves rearward with respect to the common axis 11 of the engaging projection and the engaging recess. Then, the stroller frame is collapsed by releasing the stroller safety lock 8. Now, the two position-regulating portions 9 and 10 of the engaging recess 6 are opened. The reversible seat 5, the center of gravity of which has moved rearward, is pushed so as to automatically rotate rearward together with the engaging recess 6 and approaches the front leg tube 2 along with the rear leg tube 3. Thus, the reversible seat 5 and the stroller frame are collapsed together.

It will be understood that the term "comprise" and any of its derivatives (e.g. comprises, comprising) as used in this specification is to be taken to be inclusive of features to which it refers, and is not meant to exclude the presence of any additional features unless otherwise stated or implied.

The reference to any prior art in this specification is not, and should not be taken as, an acknowledgement of any form of suggestion that such prior art forms part of the common general knowledge.

Although an illustrative embodiment of the present invention has been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A collapsible stroller comprising a frame, the frame comprising a handle tube, a front leg tube comprising a front wheel assembly, a rear leg tube comprising a rear wheel assembly, and a stroller frame joint assembly connecting the handle tube, the front leg tube and the rear leg tube with each other, the stroller frame joint assembly comprising a mount for a reversible seat, where the reversible seat is mountable in either of a forward or rearward orientation with respect to the stroller frame, the reversible seat comprising at least a backrest portion, a seating portion, an armrest portion and a seat joint assembly connecting the backrest portion, the seating portion and the armrest portion, and the or each mount for the reversible seat comprises a single attachment point for the seat joint assembly, wherein in use, the mount is rotatable with respect to the stroller frame joint assembly during collapse of the stroller, so that each of the handle tube, front leg tube and rear leg tube of the stroller frame, and the backrest portion, seating portion and armrest portion of the reversible seat are all substantially parallel when collapsed, irrespective of whether the reversible seat was in the forward or rearward orientation with respect to the stroller frame, wherein the reversible seat further comprises a seat safety lock for controlling the opening and closing of the seat joint assembly, the seat joint assembly being movable between a locked state in which the reversible seat is locked into a fully opened state, and a released state in which the reversible seat is collapsible, and wherein when the seat joint assembly is in the locked state, the armrest portion is positioned at a height for normal use, and when the seat joint assembly is in the released state the armrest portion follows the backrest portion of the seat when this is rotated between either of its fully opened or collapsed positions, so as to thereby lay substantially parallel to the backrest portion when collapsed, wherein the seat joint assembly further comprises an armrest stopper, wherein when the seat joint assembly is in the locked state, the armrest portion is positioned at a height for normal use by the armrest stopper, and when the seat joint assembly is in the released state the armrest stopped can be rotated along with the seat joint assembly away from the armrest portion so that the armrest portion is in a free state, or rotated along with the seat joint assembly toward the armrest portion so as to come into contact with the armrest portion, thus causing the armrest portion to be opened, and wherein the seat joint assembly comprises a first engaging member, a second engaging member, a movable slider, an elastic member, a pushing member and an armrest guide block, and wherein the seating portion is fixedly attached to the first engaging member, and the backrest portion is fixedly attached to the second engaging member, the movable slider, the elastic member and the pushing member are arranged between the first engaging member and the second engaging member; and wherein the armrest guide block is fixed at one end of the armrest portion and is movably fitted in guiding grooves of the first engaging member and the second engaging member; and wherein the first engaging member, the movable slider, the pushing member and the second engaging member are connected with each other by means of a pivot pin, the movable slider can be moved in an axial direction of the pivot pin by the pushing member, and the first and second engaging members are engaged or released under the effect of the movable slider.

2. The collapsible stroller of claim 1, wherein the seat joint assembly comprises an engaging projection, and the mount for the reversible seat comprises a single engaging recess for receiving the engaging projection of the reversible seat.

3. The collapsible stroller of claim 1, wherein the stroller frame joint assembly comprises position-regulating portions, and wherein in use, when the stroller frame is deployed, the position-regulating portions move the attachment point of the mount into a position suitable for the mounting of the reversible seat, and when the stroller frame is collapsed, the position-regulating portions open with the rotation of the stroller frame so that the attachment point comes into a rotatable state.

4. The collapsible stroller of claim 1, wherein when the reversible seat is mounted in a forward orientation, the mount rotates in a forward direction during collapse, and the reversible seat collapses against the front leg tube.

5. The collapsible stroller of claim 1, wherein when the reversible seat is mounted in a rearward orientation, the mount rotates in a rearward direction during collapse, and the reversible seat collapses against the rear leg tube.

6. The collapsible stroller of claim 1, wherein the stroller frame joint assembly comprises an upper joint fixedly attached to the handle tube, a lower joint fixedly attached to the front leg tube, a joint cover fixedly attached to the rear leg tube, and a stroller safety lock for controlling the pivoting of the upper joint and the lower joint; the upper joint and the lower joint can pivot about a common axis or two respective axes on the joint cover, and are meshed with each other by gears.

7. The collapsible stroller of claim 6, wherein the stroller frame joint assembly is provided with two position-regulating portions, in which a first position-regulating portion is provided on the lower joint and a second position-regulating portion is provided on the upper joint.

8. The collapsible stroller of claim 1, wherein the armrest stopper is provided on the second engaging member so as to cooperate with the armrest guide block.

9. The reversible seat according to claim 1, wherein the seat safety lock comprises a releasing lever provided on the backrest portion and connected to the pushing member through a pulling member.

* * * * *